United States Patent [19]
Heo et al.

[11] Patent Number: 6,046,774
[45] Date of Patent: Apr. 4, 2000

[54] DEVICE AND METHOD FOR VARIABLE LENGTH CODING OF VIDEO SIGNALS DEPENDING ON THE CHARACTERISTICS

[75] Inventors: Seo Weon Heo, Seoul, Rep. of Korea; Jong Kyu Kim; In Seop Lee, both of Wheeling, Ill.

[73] Assignee: Goldstar Co., Ltd., Seoul, Rep. of Korea

[21] Appl. No.: 08/613,547

[22] Filed: Mar. 11, 1996

Related U.S. Application Data

[63] Continuation of application No. 08/248,979, May 26, 1994, abandoned.

[30] Foreign Application Priority Data

Jun. 2, 1993 [KR] Rep. of Korea .......................... 93-9930

[51] Int. Cl.⁷ ...................................................... H04N 7/18
[52] U.S. Cl. ............................ 348/402; 348/700; 348/402; 348/405; 348/409; 348/404
[58] Field of Search ..................................... 348/420, 411, 348/416, 405, 404, 699, 700

[56] References Cited

U.S. PATENT DOCUMENTS

| | | | |
|---|---|---|---|
| 5,007,102 | 4/1991 | Haskell | 348/415 |
| 5,103,305 | 4/1992 | Watanabe | 348/416 |
| 5,134,477 | 7/1992 | Knauer | 348/411 |
| 5,164,963 | 11/1992 | Lawrence et al. | 348/410 |
| 5,214,507 | 5/1993 | Aravind et al. | 348/410 |
| 5,285,276 | 2/1994 | Citta | 348/409 |
| 5,298,896 | 3/1994 | Lei et al. | 341/51 |
| 5,339,164 | 8/1994 | Lim | 358/261.1 |
| 5,444,800 | 8/1995 | Kim | 382/229 |
| 5,461,679 | 10/1995 | Normille et al. | 382/304 |
| 5,511,136 | 4/1996 | Kim | 382/275 |

*Primary Examiner*—Tommy P. Chin
*Assistant Examiner*—Anand Rao
*Attorney, Agent, or Firm*—Finnegan, Henderson, Farabow, Garrett & Dunner, L.L.P.

[57] ABSTRACT

An apparatus and a method of compressing and expanding a video signal. The apparatus includes a variable length coder controller and a quantizer. The coder controller compares a bit amount generated in the use of an optimum symbol with that in the use of an existing symbol upon detection of a scene change and outputs a new symbol upon the presence of a gain in accordance with the compared result. A frame delay delays input image data in a unit frame, a subtracter for subtracting an output signal of the frame delay from the input image data, and a scene change detector for detecting a scene change of the input image data. A motion detector detects a motion in the input image data, a main codebook for forming variable sub-codebooks for a still picture, a codebook controller for selecting a specified portion of the main codebook and variable sub-codebooks, and a vector formation unit for forming the input image data into a vector. A distortion measurement unit obtains a codeword with a minimum distortion using the variable sub-codebooks if the input image data is the still picture and using the main codebook if the input image data is a motion picture, and a code assignment unit for assigning a proper code to an output signal from the distortion measurement unit.

9 Claims, 8 Drawing Sheets

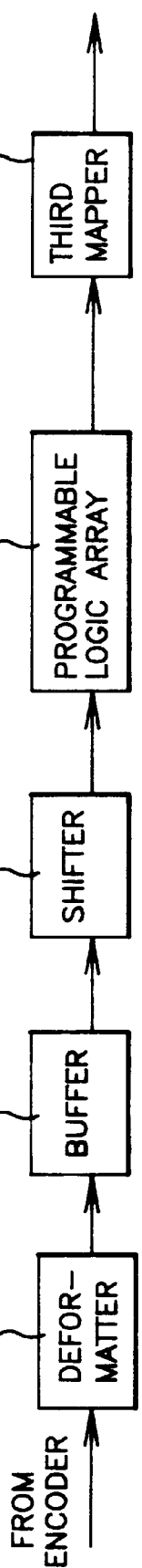
F I G. 1b

F I G.2
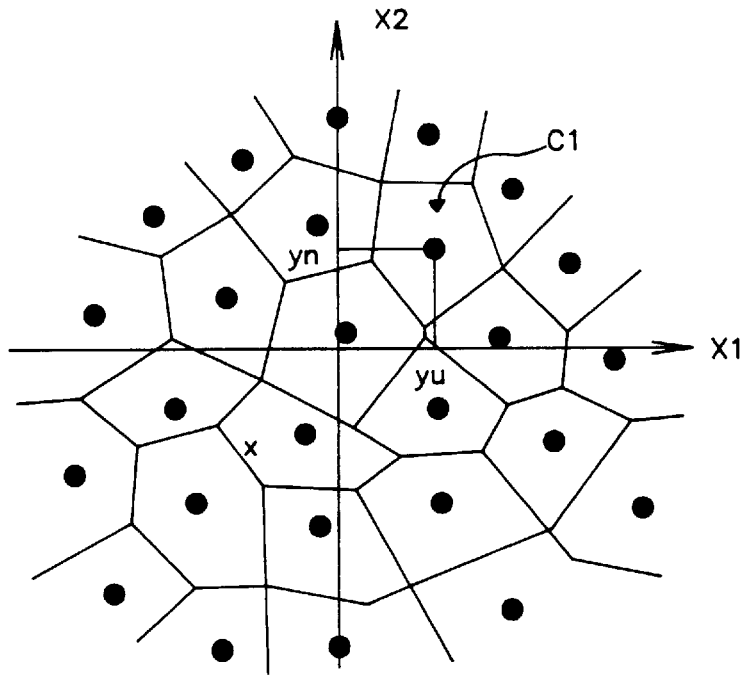
F I G.3
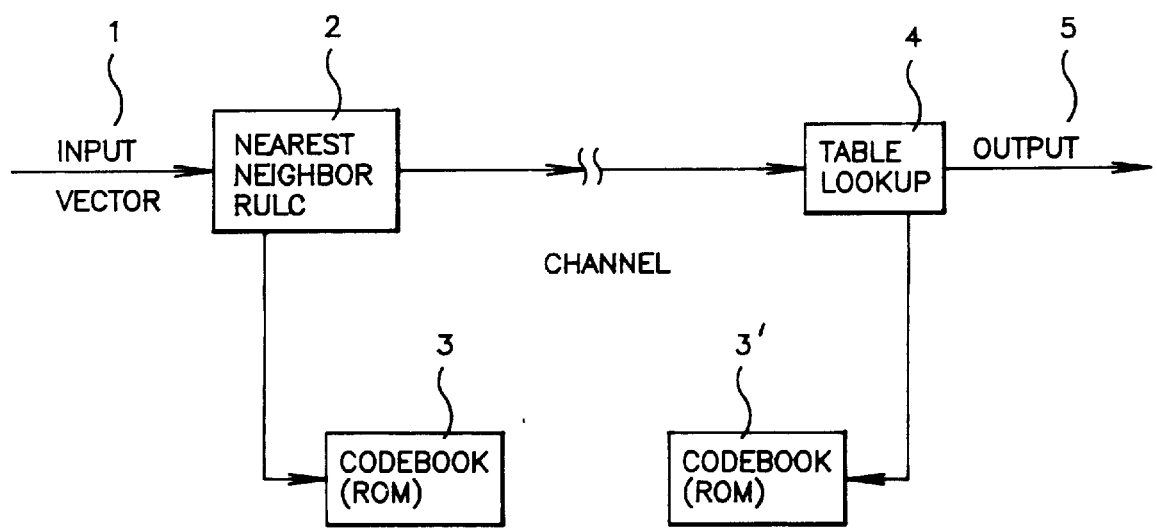

DEVICE AND METHOD FOR VARIABLE LENGTH CODING OF VIDEO SIGNALS DEPENDING ON THE CHARACTERISTICS

This application is a continuation of application Ser. No. 08/248,979, filed May 26, 1994, now abandoned.

BACKGROUND OF THE INVENTION

The present invention relates, in general, to video signal processing in a high definition television (referred to hereinafter as HDTV), and more particularly, to an apparatus and a method for compressing/expanding a video signal.

2. Discussion of the Related Art

HDTVs have been regarded as the next-generation video communication means, and have received individual studies, which are classified as, for example, an HD-MAC system in Europe and a full digital ATV system in the U.S.A., since a study of a MUSE system of the analog transmission type was published by NHK, Japan, in the 1980s.

Generally, in pursuit of high picture quality and large-scale screen, such an HDTV has a resolution of at least twice that of an existing color TV, information amount of about five times that of the existing color TV, a screen size of at least thirty inches and a color reemergence of about ten times that of the existing color TV.

Also, the HDTV has a hi-fi sound quality corresponding to a compact disc. In an HDTV field, no local broadcasting station is required, and a satellite broadcasting system comes to the fore to completely clear up poor reception areas. Also, the satellite broadcasting system has been receiving careful study for combining with a ground broadcasting system.

In the HDTV studies up to the present, an HDTV signal has a bandwidth wider than existing television signals. Particularly in the U.S.A., it is prescribed that the HDTV signal be broadcasted simultaneously with an existing television signal having a bandwidth of 6 MHz. For this reason, the HDTV studies in and outside the country have been concentrated on a compression technique.

A general variable length coder uses a fixed codeword that is obtained by previously calculating a statistical value with respect to several video signals. Because the codeword used in the variable length coder is fixed, a bit amount is increased and performance is reduced in the case where an input video signal is not matched with a characteristic of the codeword. In order to solve this problem, means capable of using a codeword table with a plurality of codewords and sending a selected one of the codewords has been proposed. One example of this is shown in FIGS. 1A and 1B.

Referring to FIG. 1A, a block diagram of a compression part of a conventional apparatus is shown for compressing/expanding a video signal. The compression part of the conventional video signal compression/expansion apparatus is an encoder. As shown in FIG. 1A, the encoder includes a motion estimator 10 for estimating a motion of the video signal inputted through an input terminal Vin. A motion compensator 20 compensates for the motion of the video signal in response to a motion vector signal from the motion estimator 10. A subtracter 30 subtracts an output signal from the motion compensator 20 from the video signal inputted through the input terminal Vin to output a difference signal. A discrete cosine transformer (DCT) 40 performs a discrete cosine transform with respect to the difference signal from the subtracter 30 to remove a spatial redundancy. A quantizer 50 compresses output information from the discrete cosine transformer 40 so that the output information from the discrete cosine transformer 40 is approximated to a finite number of values, to reduce an amount of the output information from the discrete cosine transformer 40.

An inverse quantizer 60 is provided in the encoder to restore an output signal from the quantizer 50 to its original state. An inverse discrete cosine transformer 70 is also provided in the encoder to transform an output signal from the inverse quantizer 60 into a spatial signal.

An adder 80 is also provided in the encoder to add an output signal from the inverse discrete cosine transformer 70 to the output signal from the motion compensator 20 and feed-back the resultant signal to the motion compensator 20. A mapper 90 is provided in the encoder to output information corresponding to the output signal from the quantizer 50.

Also, the encoder includes a variable length coder (VLC) 100 for reducing an amount of the output information from the mapper 90 without losing the characteristic of the output information from the mapper 90. A buffer 110 prevents an underflow or an overflow of an output signal from the variable length coder 100 resulting from transmission at a fixed bit rate, and a formatter 120 formats an output signal from the buffer 110 to a suitable transmission format.

Referring to FIG. 1B, a block diagram of an expansion part of the conventional apparatus is shown for compressing/expanding the video signal. The expansion part of the conventional video signal compression/expansion apparatus is a decoder. As shown in FIG. 1B, the decoder includes a deformatter 130 for deformatting an output signal from the formatter 120 in the encoder in FIG. 1A to a suitable reception format. A buffer 140 adjusts the number of bits of an output signal from the deformatter 130 at a desired rate. A shifter 150 shifts an output signal from the buffer 140 and a programmable logic array 160 is connected to an output of the shifter 150. The programmable logic array 160 stores a predetermined codeword.

The decoder also includes a second mapper 170 for outputting information corresponding to the predetermined codeword in the programmable logic array 160.

A general vector quantization defines a K-dimensional Euclidean space $R^K$ as a map Q of finite partial sets Y, as follows:

Q: $R^K$ Y

Y=/Xi: sets of reproduction vectors where, i=1, 2, . . . , N and N is the vector number of Y.

The vector quantization is generally classified into two functions, encoding and decoding. In the encoding function, the vector quantization maps an input vector X onto a reproduction vector address based on Q(X). In the decoding function, the vector quantization finds a reproduction vector /X based on the address in the encoding.

FIG. 2 is a view illustrating partitioning of a two-dimensional space into twenty-six cells. In this drawing, each round black dot means a representative value of each cell. A difference between the input vector X and the reproduction vector /X is called a distortion measurement d(X, /X). A simple example of the distortion measurement is a square error distortion that can be defined as follows:

$$d(X, /X) = \|X - /X\|^2 = \sum_{j=0}^{M}(X^2 j - /X^2 j)$$

The vector quantization makes a set Y suitable for the input vector, compares the input vector with the set Y on the basis of the previously defined distortion to find a vector X with a minimum distortion, and sends an address of the found vector X.

Referring to FIG. 3, a block diagram of a general vector quantizer is shown. A codebook is produced suitably for the implementation of a system by means of a proper algorithm and then stored in codebook read only memories (ROMS) 3 and 3'. The encoder and decoder must have the same codebook.

Input data is rearranged in the same format as that of codewords in the codebook and then compared with all the codewords in the codebook according to a nearest neighbor rule 2. Then, a codeword with a minimum distortion is found among the codewords in the codebook based on a distortion measurement employed by the system. As a result, an address of the found codeword is sent. In this case, the distortion measurement used may include a mean square error, a weighted mean square error, and a linear estimate measurement.

Based on the sent codeword address, the decoder finds an original value of the codeword using a lookup table 4 and transmits the found value. As a result, a transmission rate is significantly reduced.

The conventional video signal compression/expansion apparatus has a disadvantage in that the codeword with the minimum distortion is selected among the codewords in the codebook by comparing the input data with all the codewords in the codebook. In other words, the search time for the codewords is increased relative to a size of the codebook. Also, the comparison of the input data with all the codewords is very inefficient and requires a separate high speed search device in hardware implementation.

SUMMARY OF THE INVENTION

The present invention has been made in view of the above problems, and it is an object of the present invention to provide an apparatus and a method for compressing/expanding a video signal in which learning is performed for a predetermined time period if a scene change is detected, an optimum symbol is allowed to correspond to a given codebook, a bit amount generated in the use of the optimum symbol is compared with that in the use of an existing symbol, a new symbol is sent upon the presence of a gain in accordance with the compared result, and a sent codeword is directly used and a different symbol is allowed to correspond to an existing codeword in the decoding.

It is another object of the present invention to provide an apparatus and a method for compressing/expanding a video signal in which scene change and motion are detected to reduce the search time required in finding a codeword from a codebook.

In accordance with one aspect of the present invention, an apparatus is provided for compressing/expanding a video signal, comprising motion estimation means for estimating a motion of the video signal inputted through an input terminal; motion compensation means for compensating for the motion of the video signal in response to a motion vector signal from the motion estimation means; subtraction means for subtracting an output signal from the motion compensation means from the video signal inputted through the input terminal to output a difference signal; discrete cosine transform means for performing a discrete cosine transform with respect to the difference signal from the subtraction means to remove a spatial redundancy; quantization means for compressing output information from the discrete cosine transform means such that the output information from the discrete cosine transform means is approximated to a finite number of values, to reduce an amount of the output information from the discrete cosine transform means; inverse quantization means for restoring an output signal from the quantization means to its original state; inverse discrete cosine transform means for transforming an output signal from the inverse quantization means into a spatial signal; adding means for adding an output signal from the inverse discrete cosine transform means to the output signal from the motion compensation means and feeding back the resultant signal to the motion compensation means; first mapping means for outputting information corresponding to the output signal from the quantization means; scene change detection means for detecting a scene change of the video signal inputted through the input terminal; variable length coder control means for comparing a bit amount generated in the use of an optimum symbol with that in the use of an existing symbol in response to a scene change detect signal from the scene change detection means and outputting a new symbol upon the presence of a gain in accordance with the compared result; second mapping means for outputting information corresponding to a new codeword from the variable length coder control means; first multiplexing means for selectively outputting one of the output information from the first and second mapping means; variable length coder means for reducing an amount of the output information from the first multiplexing means with no loss of a characteristic of the output information from the first multiplexing means; first buffering means for preventing an underflow or an overflow of an output signal from the variable length coder means resulting from transmission at a fixed bit rate; and formatting means for formatting an output signal from the first buffering means to a suitable transmission format.

In accordance with another aspect of the present invention, a method of compressing/expanding a video signal is provided, comprising the steps of obtaining a difference signal between input image data and data obtained by delaying the input image data in a unit frame; comparing the difference signal with a scene change threshold value and detecting a scene change of the input image data in accordance with the compared result; performing a full search using a main codebook upon detection of the scene change of the input image data; forming variable sub-codebooks in the main codebook through the full search; comparing the difference signal with a motion estimation threshold value upon detection of no scene change of the input image data and detecting a motion in the input image data in accordance with the compared result; finding a proper codeword using the variable sub-codebooks upon detection of no motion in the input image data; and finding the proper codeword using the main codebook upon detection of the motion of the input image data.

BRIEF DESCRIPTION OF THE DRAWINGS

The above and other objects, features and advantages of the present invention will be more clearly understood from the following detailed description taken in conjunction with the accompanying drawings, in which:

FIG. 1B is a block diagram of an expansion part of the conventional apparatus for compressing/expanding the video signal;

FIG. 2 is a view illustrating partitioning of a two-dimensional space into twenty-six cells;

FIG. 3 is a block diagram of a general vector quantizer;

DETAILED DESCRIPTION OF THE PREFERRED EMBODIMENT

Figure 4:
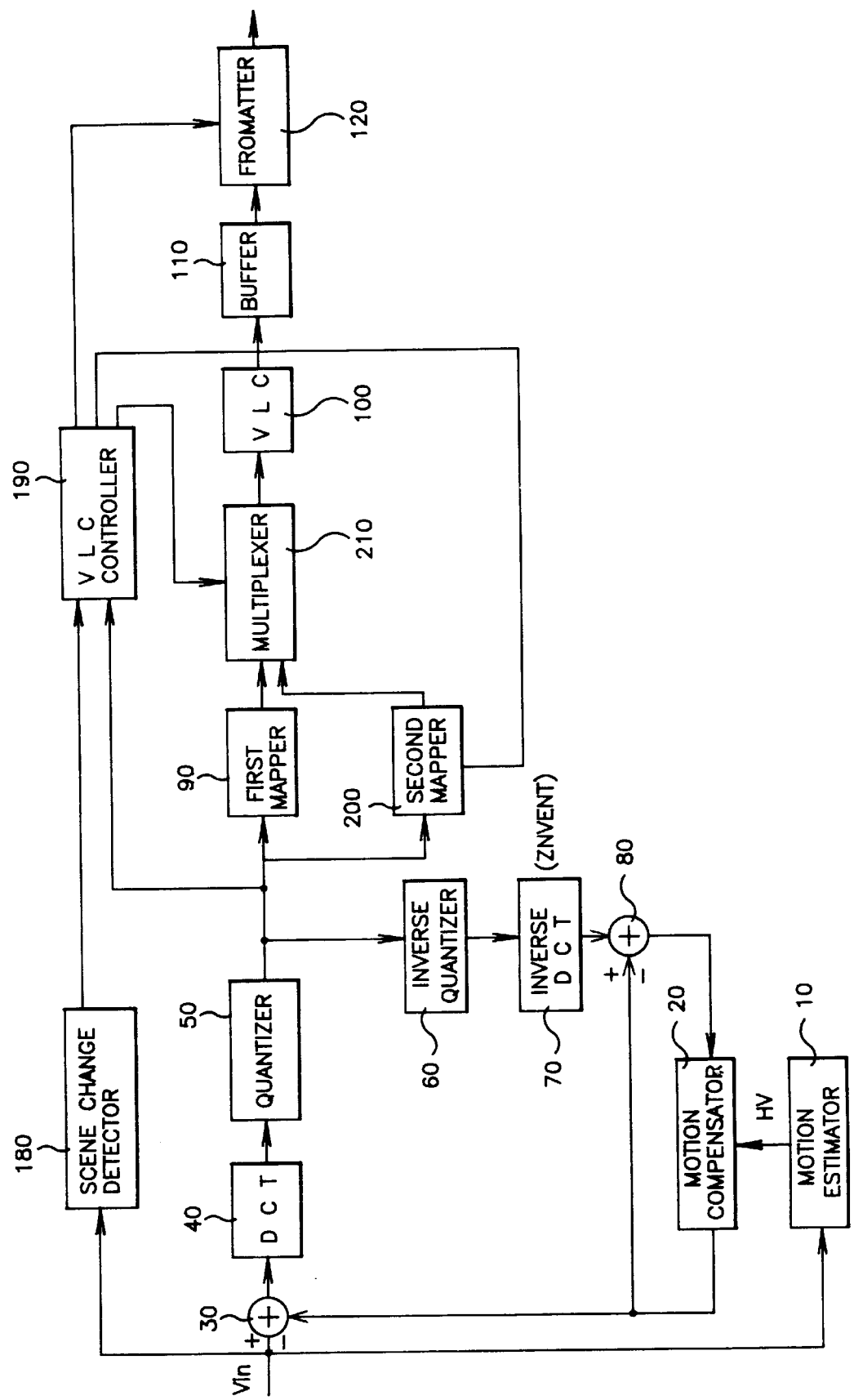
FIG. 4 is a block diagram of a compression part of an apparatus for compressing/expanding a video signal in accordance with the present invention.

Referring to FIG. 4, a block diagram of a compression part of an apparatus for compressing/expanding a video signal is shown in accordance with the present invention. Some of the parts in this drawing are the same as those in FIG. 1A. Therefore, like reference numerals designate like parts.

The compression part of the video signal compression/expansion apparatus is an encoder. As shown in FIG. 4, the motion estimator 10 is provided in the encoder to estimate the motion of the video signal inputted through the input terminal Vin. The motion compensator 20 is adapted to compensate for the motion of the video signal in response to a motion vector signal from the motion estimator 10. The subtracter 30 outputs the difference signal by subtracting the output signal from the motion compensator 20 from the video signal inputted through the input terminal Vin.

Discrete cosine transformer (DCT) 40 is also provided in the encoder to perform the discrete cosine transform with respect to the difference signal from the subtracter 30 to remove spatial redundancy. The quantizer 50 is adapted to compress the output information from the discrete cosine transformer 40 such that the output information from the discrete cosine transformer 40 is approximated to a finite number of values, to reduce the amount of the output information from the discrete cosine transformer 40.

The inverse quantizer 60 is also provided in the encoder to restore the output signal from the quantizer 50 to its original state. The inverse discrete cosine transformer 70 is adapted to transform the output signal from the inverse quantizer 60 into the spatial signal. The adder 80 adds the output signal from the inverse discrete cosine transformer 70 to the output signal from the motion compensator 20 and feeds back the resultant signal to the motion compensator 20.

A first mapper 90 is also provided in the encoder to output information corresponding to the output signal from the quantizer 50.

Also, the encoder includes a scene change detector 180 for detecting a scene change in the video signal inputted through the input terminal Vin. A variable length coder controller 190 compares a bit amount generated in the use of an optimum symbol with that in the use of an existing symbol in response to a scene change detect signal from the scene change detector 180 and outputs a new symbol upon the presence of a gain in accordance with the compared result. A second mapper 200 outputs information corresponding to a new codeword from the variable length coder controller 190. A multiplexer 210 selectively outputs one of the output information from the first and second mappers 90 and 200.

The variable length coder (VLC) 100 is adapted to reduce an amount of the output information from the multiplexer 210 without losing the characteristic of the output information from the multiplexer 210.

The buffer 110 is also provided in the encoder to prevent the underflow or the overflow of the output signal from the variable length coder 100 resulting from transmission at a fixed bit rate. The formatter 120 formats the output signal from the buffer 110 to a suitable transmission format.

Figure 5:
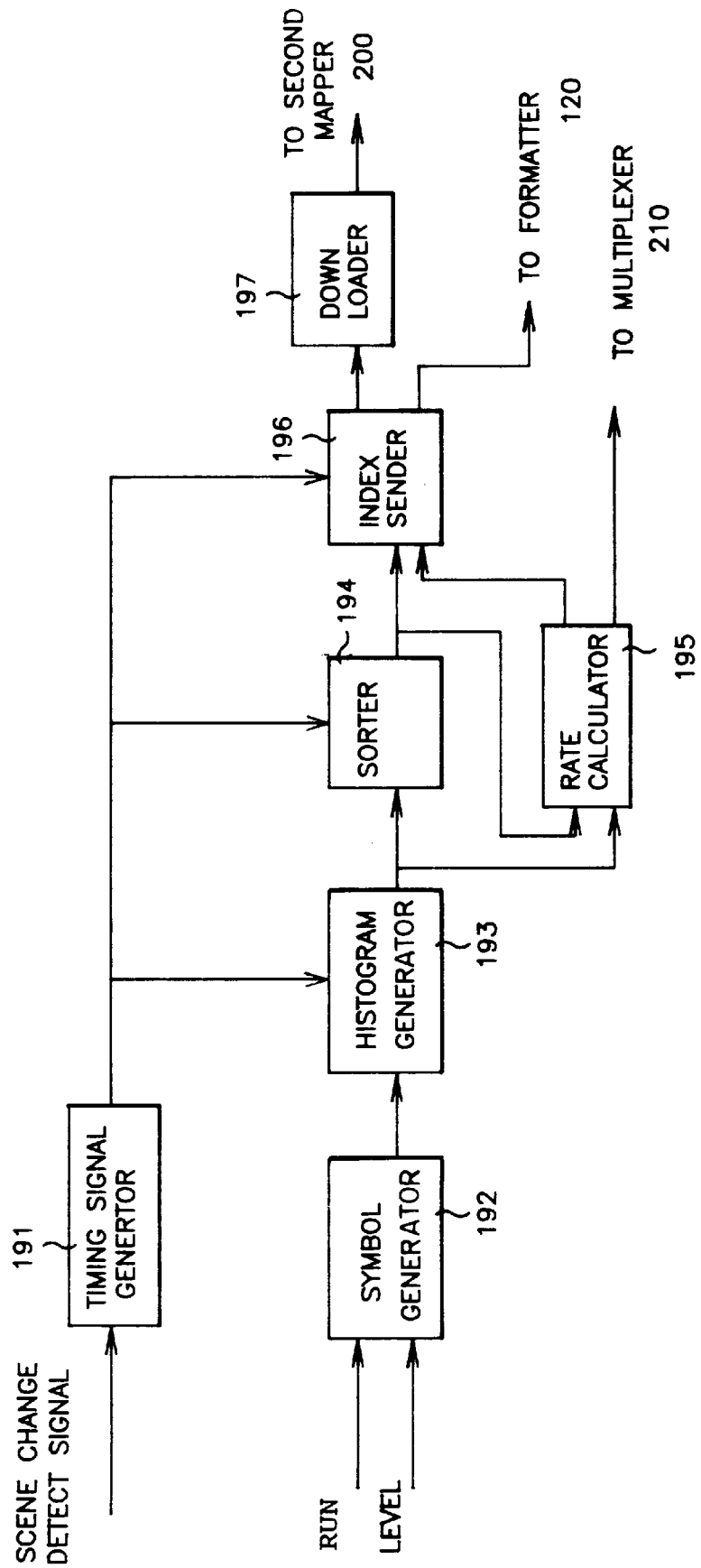
FIG. 5 is a detailed block diagram of a variable length coder controller in FIG. 4.

Referring to FIG. 5, a detailed block diagram of the variable length coder controller 190 in FIG. 4 is shown. As shown in this drawing, the variable length coder controller 190 includes a timing signal generator 191 for generating a control timing signal, at a fixed period, in response to the scene change detect signal from the scene change detector 180. A symbol generator 192 generates symbols corresponding to run and level signals from the quantizer 50 and a histogram generator 193 generates a histogram according to frequencies of the symbols from the symbol generator 192. A sorter 194 sorts the symbols from the symbol generator 192 according to a statistical value obtained for a predetermined learning time period and the frequencies of the symbols in response to an output signal from the histogram generator 193.

Also, the variable length coder controller 190 includes a rate calculator 195 for comparing the bit amount generated in the use of the optimum symbol with that in the use of the existing symbol and outputting the new symbol upon the presence of the gain in accordance with the compared result. An index sender 196 indexes the new codeword in response to output signals from the sorter 194 and rate calculator 195 and sends the indexed new codeword to the formatter 120. A downloader 197 downloads the indexed new codeword from the index sender 196 into the second mapper 200.

The operation of the encoder with the above-mentioned construction in accordance with the present invention will hereinafter be described in detail with reference to FIG. 4.

First, if an absolute value of a difference between the present frame and the previous frame is greater than a predetermined threshold value, the scene change detector 180 recognizes the scene change and, thus, outputs the scene change detect signal. Also, the scene change detector 180 performs a new learning process for a new scene.

In this case, the variable length coder controller 190 stops learning and performs the new learning process for the predetermined time period. As a result, the variable length coder controller 190 allows the optimum symbol to correspond to a given codebook and compares the bit amount generated in the use of the optimum symbol with that in the use of the existing symbol. Upon the presence of a gain in accordance with the compared result, the variable length coder controller 190 sends the new codeword to the formatter 120 and downloads the new codeword into the second mapper 200.

Also, the new symbol must periodically be sent in case of a channel variation, because no codeword for use is present. This sending of the new symbol is performed by the timing signal generator 191.

The subtracter 30 outputs the difference signal by subtracting the output signal from the motion compensator 20 from the video signal inputted through the input terminal Vin. The spatial redundancy of the difference signal from the subtracter 30 is removed by the discrete cosine transformer 40. The quantizer 50 reduces the amount of the output information from the discrete cosine transformer 40 by compressing the output information from the discrete cosine transformer 40. The output signal from the quantizer 50 is applied to the first mapper 90 so that the quantized signal can be converted into a variable length code without losing the position and size information.

Upon detection of no scene change in the scene change detector 180, the output signal from the first mapper 90 is transferred through the multiplexer 210. However, upon detection of a scene change in the scene change detector 180 and upon the presence of a gain in sending the new symbol, the new codeword from the variable length coder controller 190 is downloaded into the second mapper 200 and then transferred through the multiplexer 210.

The operation of the variable length coder controller 190 will hereinafter be described in detail with reference to FIG. 5.

Upon receiving the scene change detect signal from the scene change detector 180, the timing signal generator 191 generates the control timing signal necessary for the new learning process. The timing signal from the timing signal generator 191 is applied to the histogram generator 193, the sorter 194 and the index sender 196.

The statistical characteristic of the input video signal is recognized for the predetermined learning time period. Then, the codeword from the index sender 196 is sent to the formatter 120 for use in a decoder. At this time, the codeword is not sent at every frame but at a fixed refresh period. As a result, the amount of added information is minimal.

The symbol generator 192 generates the symbols corresponding to the run and level signals from the quantizer 50 and the histogram generator 193 generates the histogram according to the frequencies of the symbols from the symbol generator 192. Based on the histogram from the histogram generator 193, the sorter 194 sorts the symbols from the symbol generator 192 according to the statistical value obtained for the predetermined learning time period and the frequencies of the symbols.

The bit amount generated using the optimum symbol is compared with that using the existing symbol by the rate calculator 195. If there is a gain in accordance with the compared result, the rate calculator 195 outputs the new symbol to the index sender 196.

In response to the output signals from the sorter 194 and rate calculator 195, the index sender 196 indexes the new codeword and sends the indexed new codeword to the formatter 120. Also, the downloader 197 downloads the indexed new codeword from the index sender 196 into the second mapper 200.

Figure 6:
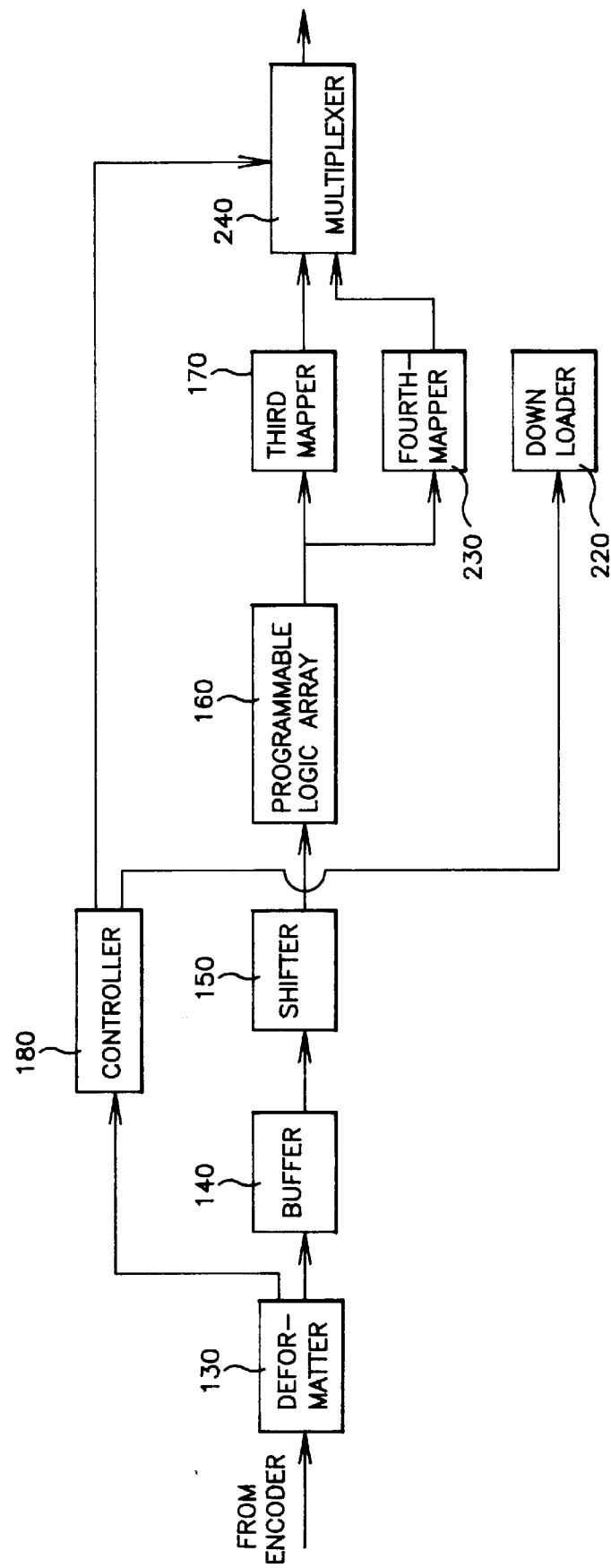
FIG. 6 is a block diagram of an expansion part of the apparatus for compressing/expanding the video signal in accordance with the present invention.

Referring to FIG. 6, a block diagram of an expansion part of the apparatus for compressing/expanding the video signal is shown in accordance with the present invention. Some of the parts in this drawing are the same as those in FIG. 1B. Therefore, like reference numerals designate like parts. The expansion part of the video signal compression/expansion apparatus is a decoder.

Figure 1A:
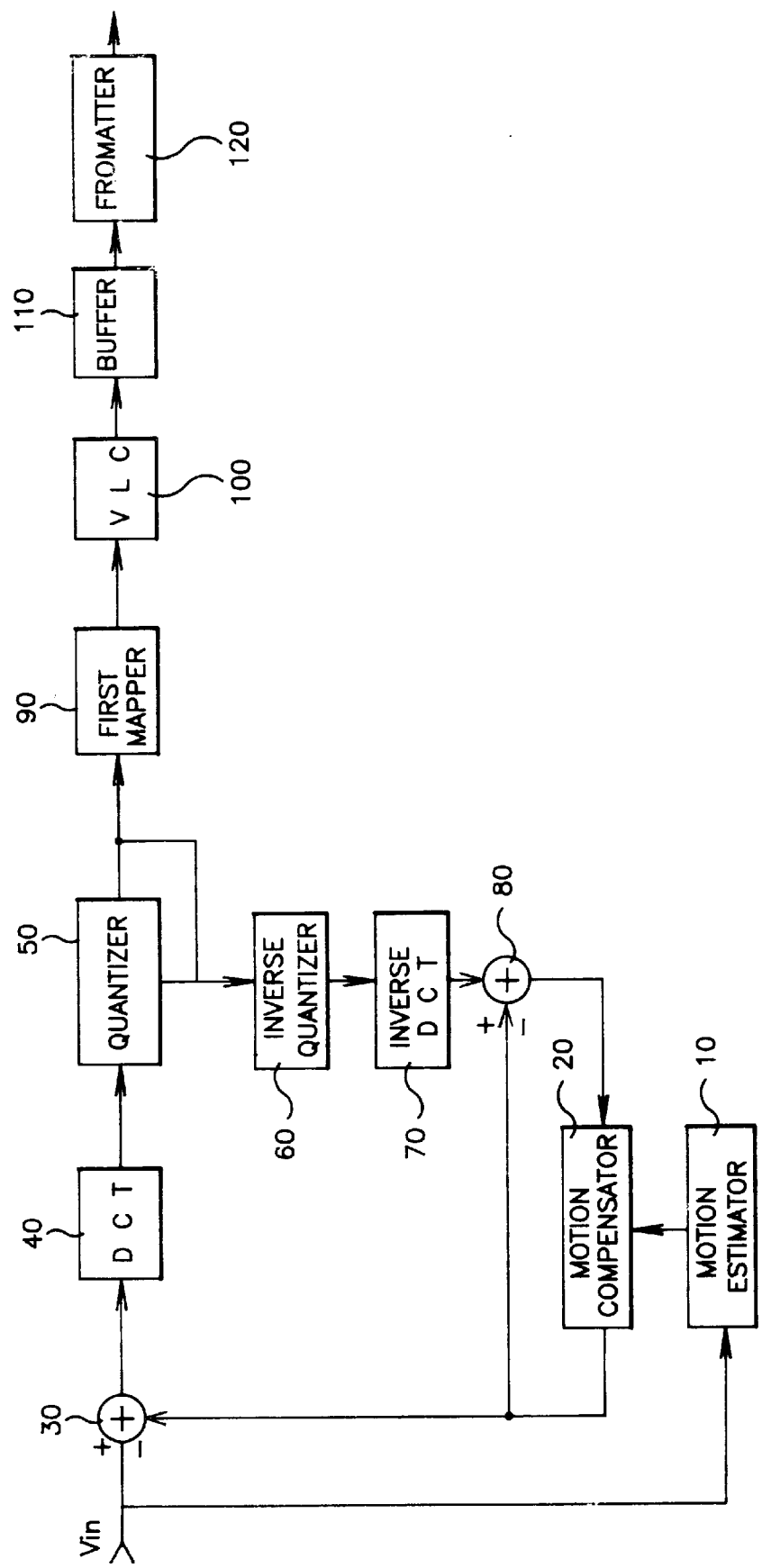
FIG. 1A is a block diagram of a compression part of a conventional apparatus for compressing/expanding a video signal.

The deformatter 130 deformats the new codeword from the formatter 120 in the encoder in FIG. 1A to a suitable reception format. The output signal from the deformatter 130 is transferred to a fourth mapper 230 through the buffer 140, the shifter 150 and the programmable logic array 160. The buffer 140 is adapted to adjust the number of bits of the output signal from the deformatter 130 at a desired rate.

The new codeword is stored in the fourth mapper 230 by a downloader 220 under a control of a controller 180. Upon receiving a signal (indicated on a previously engaged syntax) indicative of the sending of the new symbol, from the deformatter 130, the controller 180 stores the new codeword corresponding to the new symbol into the fourth mapper 230. Then, the controller 180 controls a multiplexer 240 to select the new codeword in the fourth mapper 230. It should be noted that a codeword is directly used and different symbols correspond to that codeword, for the purpose of making the construction of the hardware simple. In other words, the change of the codeword is difficult because the codeword is usually stored in the program logic array, whereas the symbol corresponding to the codeword can readily be changed.

Figure 7:
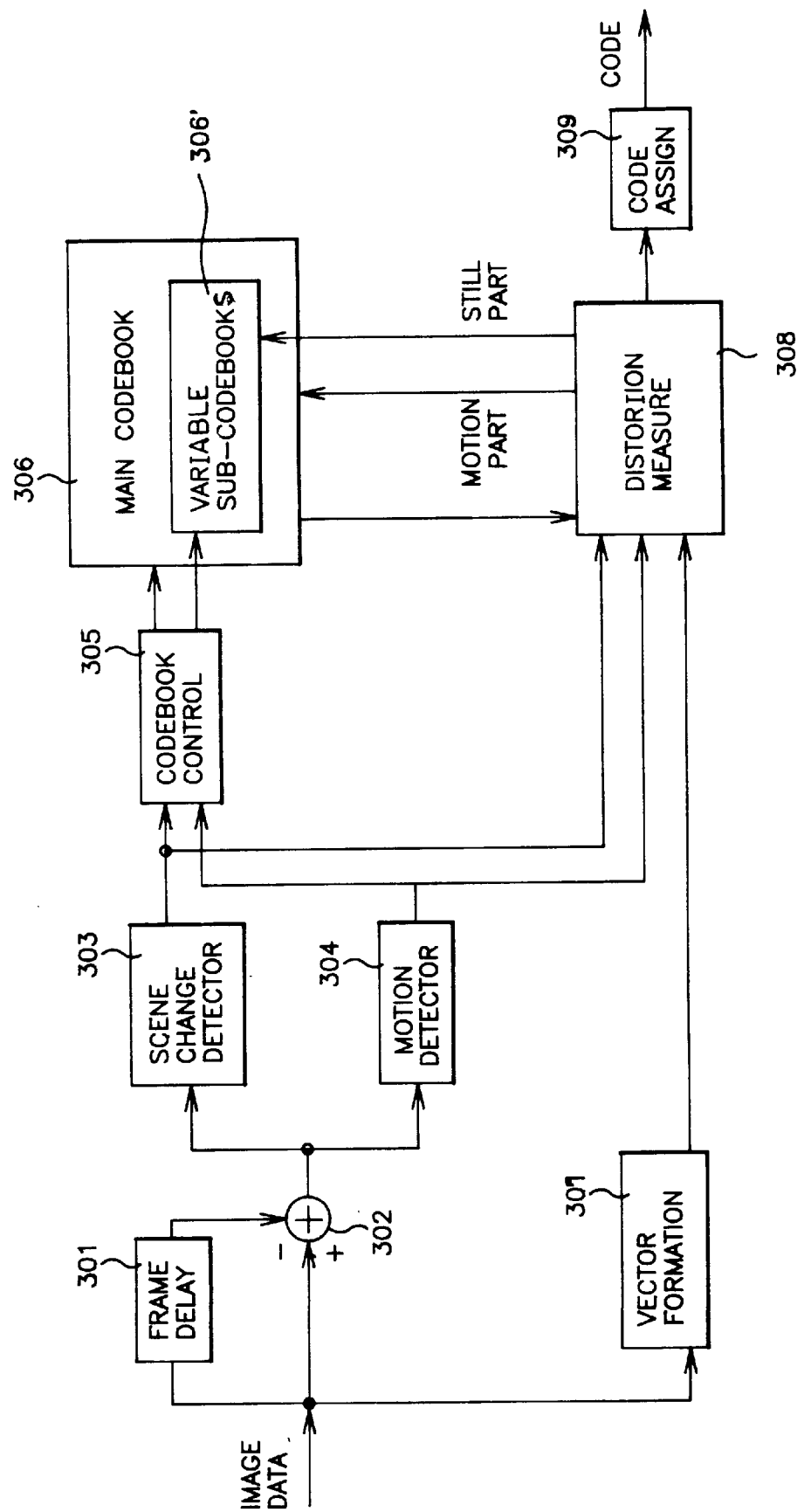
FIG. 7 is a detailed block diagram of a quantizer in FIG. 4.

Referring to FIG. 7, a detailed block diagram of the quantizer 50 in FIG. 4 is shown. As shown in this drawing, the quantizer 50 includes a frame delay 301 for delaying input image data in the unit frame, and a subtracter 302 for subtracting an output signal in the frame delay 301 from the input image data to generate a difference signal. A scene change detector 303 compares the difference signal from the subtracter 302 with a scene change threshold value to detect a scene change of the input image data. A motion detector 304 compares the difference signal from the subtracter 302 with a motion estimation threshold value to detect a motion of the input image data. A main codebook 306 forms variable sub-codebooks 306' for a still picture in response to output signals from the scene change detector 303 and motion detector 304.

Also, the quantizer 50 includes a codebook controller 305 for performing a control operation to select a specified portion of the main codebook 306 and variable sub-codebooks 306' in response to the output signals from the scene change detector 303 and motion detector 304. A vector formation unit 307 forms the input image data into a vector and a distortion measurement unit 308 responds to the output signals from the scene change detector 303 and motion detector 304 and an output signal from the vector formation unit 307. The distortion measurement unit 308 obtains a codeword with a minimum distortion using the variable sub-codebooks 306' if the input image data is a still picture and using the main codebook 306 if the input image data is a motion picture. A code assignment unit 309 assigns a proper code to an output signal from the distortion measurement unit 308.

The operation of the quantizer 50 with the above-mentioned construction in accordance with the present invention will hereinafter be described in detail with reference to FIGS. 7 and 8.

Figure 8:
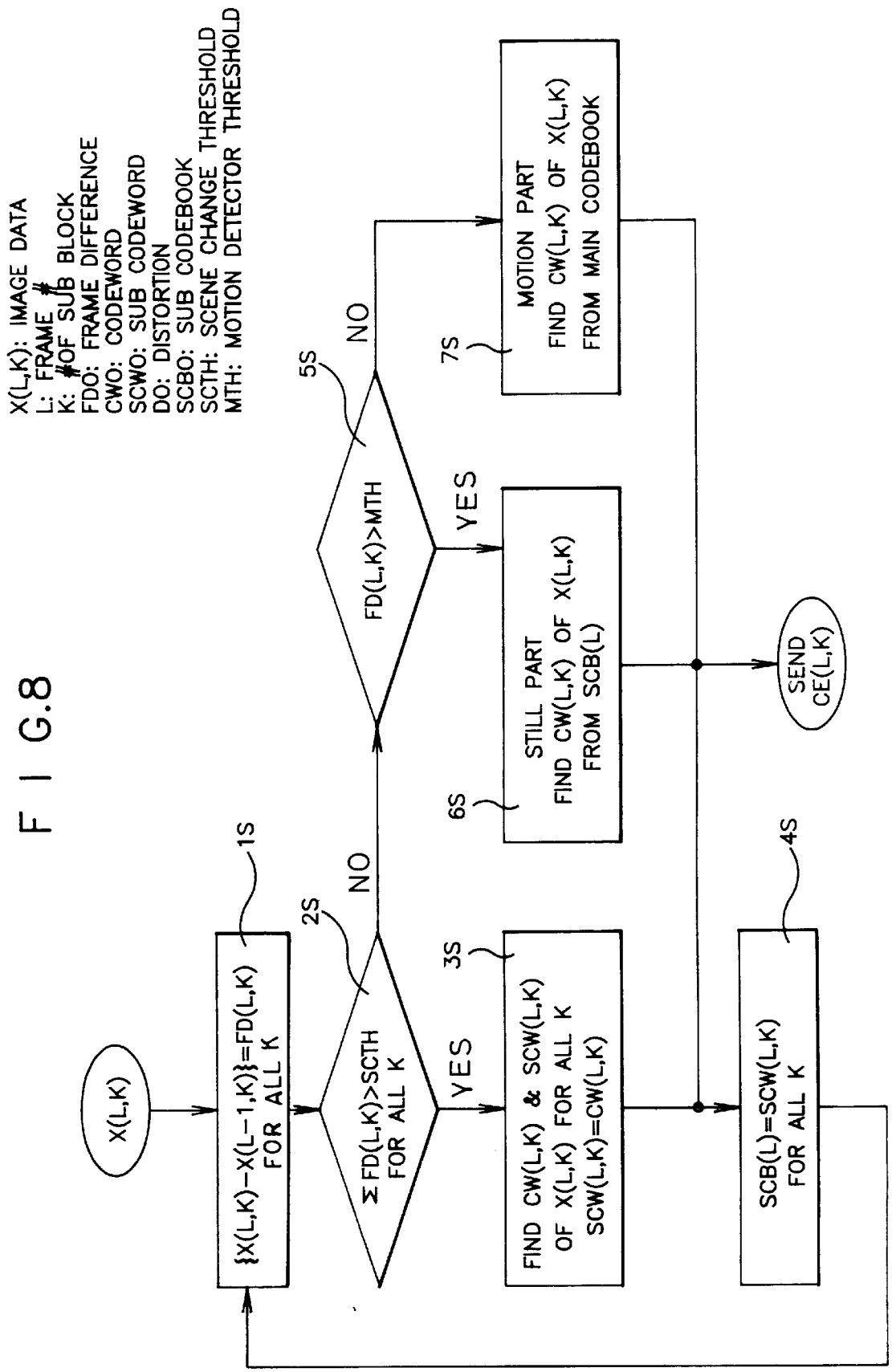
FIG. 8 is a flowchart illustrating the operation of the quantizer in FIG. 7 in accordance with the present invention.

FIG. 8 is a flowchart illustrating the operation of the quantizer 50 in FIG. 7 in accordance with the present invention.

The input image data is delayed in the unit frame by the frame delay 301 and then applied to the subtracter 302. At the step 1S, the subtracter 302 subtracts the output signal from the frame delay 301 from the input image data to generate the difference signal. The difference signal from the subtracter 302 is applied to the scene change detector 303 and the motion detector 304.

At the step 2S, the scene change detector 303 compares the difference signal from the subtracter 302 with the scene change threshold value to detect the scene change of the input image data. If the difference signal from the subtracter 302 is greater than the scene change threshold value, namely, if the scene change is detected, the codebook controller 305 controls the main codebook 306. As a result, a full search is performed using the main codebook 306 at the step 3S. At the step 4S, the variable sub-codebooks 306' are formed in the main codebook 306 through the full search. The variable sub-codebooks 306' so formed remain at the present state until the subsequent scene change is detected.

In the case where the scene change is not detected and signals analogous to the previous frame are successively inputted, the motion detector 304 compares the difference signal from the subtracter 302 with the motion estimation threshold value to detect the motion of the input image data at the step 5S. If the difference signal from the subtracter 302 is smaller than the motion estimation threshold value, it is determined that the input image data is the still part. As a result, the codebook controller 305 controls the variable sub-codebooks 306' in response to the output signal from the motion detector 304. In this case, the distortion measurement unit 308 finds the codeword with the minimum distortion among codewords of the variable sub-codebooks 306' corresponding to sub-blocks classified into the still picture ate the step 6S.

On the contrary, if the difference signal from the subtracter 302 is greater than the motion estimation threshold value, it is determined that the input image data is the motion part. As a result, the codebook controller 305 controls the main codebook 306 in response to the output signal from the motion detector 304. In this case, the distortion measurement unit 308 finds the codeword with the minimum distortion among codewords of the main codebook 306.

Noticeably, the size of the variable sub-codebooks 306' is smaller than that of the main codebook 306.

TABLE I

| IMAGE FRAME | SQNR of VQ (dB) | SQNR of MDVQ (dB) | Search Time (MDVQ/VQ) |
|---|---|---|---|
| frame 0 | 56.99 | 56.99 | 5184/5184 |
| frame 1 | 56.07 | 53.80 | 1010/5184 |
| frame 2 | 56.33 | 53.56 | 1608/5184 |
| frame 3 | 56.84 | 53.41 | 1983/5184 |
| frame 4 | 56.31 | 53.13 | 2190/5184 |
| frame 5 | 56.28 | 53.05 | 2197/5184 |
| frame 6 | 56.98 | 52.90 | 2239/5184 |
| frame 7 | 56.52 | 52.42 | 2342/5184 |
| frame 8 | 56.47 | 52.57 | 2333/5184 |
| frame 9 | 56.75 | 52.65 | 2389/5184 |
| Average | 56.55 | 52.44 | 2186/5184 |

A computer simulation result is shown in Table I using 10 frames. In accordance with the computer simulation result, the search time is reduced, on average, to 68% of that in the full search using the main codebook 306. The restored picture has a very low degradation, which is negligible.

As apparent from the above description, according to the present invention, the learning process is performed for the predetermined time period if the scene change is detected. The optimum symbol is allowed to correspond to the given codebook. Then, the bit amount generated using the optimum symbol is compared with that using the existing symbol and the new symbol is sent upon the presence of a gain in accordance with the compared result. Therefore, the generated bit amount can be reduced, resulting in an improvement in the performance of the system. Also, the coding is performed using the variable sub-codebooks. This has the effect of reducing the search time of the vector quantization.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for compressing and expanding a video signal, comprising:

motion estimation means having an input terminal for estimating a motion in the video signal inputted through the input terminal and generating a notion vector signal;

motion compensation means for compensating for the motion in the video signal in response to the motion vector signal;

subtraction means for subtracting an output signal of said motion compensation means from the video signal to output a difference signal;

discrete cosine transform means for performing a discrete cosine transform with respect to the difference signal from said subtraction means to remove spatial redundancy;

quantization means for compressing output information from said discrete cosine transform means, the output information from said discrete cosine transform means being approximated to a finite number of values to reduce an amount of the output information from said discrete cosine transform means;

inverse quantization means for restoring an output signal from said quantization means to an original state;

inverse discrete cosine transform means for transforming an output signal from said inverse quantization means to a spatial signal;

adding means for adding an output signal from said inverse discrete cosine transform means to the output signal from said motion compensation means and feeding back a resultant signal to said motion compensation means;

first mapping means for outputting information corresponding to the output signal from said quantization means;

scene change detection means for detecting a scene change in the video signal inputted through the input terminal;

variable length coder control means for stopping a learning occurring after the scene change and performing a new learning for a predetermined time period and allowing an optimum symbol to correspond to a given codebook, the variable length coder control means comparing a bit amount generated using the optimum symbol with a bit amount generated using an existing symbol in response to a scene change detect signal from said scene change detection means and a statistical characteristic of said changed scene, the variable length coder control means outputting a new symbol when a gain is present in accordance with a result of comparison of the bit amounts;

second mapping means for outputting information corresponding to said new symbol from said variable length coder control means;

first multiplexing means for selectively outputting the output information from one of said first and second mapping means;

variable length coder means for reducing an amount of the output information from said first multiplexing means without losing a characteristic of the output information from said first multiplexing means;

first buffering means for preventing one of an underflow and an overflow of an output signal from said variable length coder means resulting from transmission at a fixed bit rate; and formatting means for formatting an output signal from said first buffering means to a suitable transmission format.

2. An apparatus for compressing and expanding a video signal according to claim 1, wherein said variable length coder control means includes:

a timing signal generator for generating a control timing signal at a fixed period in response to the scene change detect signal from said scene change detection means;

a symbol generator for generating symbols corresponding to run and level signals from said quantization means;

a histogram generator for generating a histogram according to frequencies of the symbols from said symbol generator and producing an output signal;

a sorter for sorting the symbols from said symbol generator according to a statistical value obtained for a predetermined learning time period and the frequencies of the symbols in response to the output signal from said histogram generator;

a rate calculator for comparing a bit amount generated using the optimum symbol with that using the existing symbol and outputting the new symbol when the gain is present in accordance with the compared result;

an index sender for indexing the new codeword in response to output signals from said sorter and rate calculator and sending an indexed new codeword to said formatting means; and a downloader for downloading the indexed new codeword from said index sender to said second mapping means.

3. An apparatus for compressing and expanding a video signal according to claim 1, further comprising:

deformatting means for deformatting an output signal from said formatting means to a suitable reception format;

second buffering means for adjusting a number of bits of an output signal from said deformatting means at a desired rate;

shifting means for shifting an output signal from said second buffering means;

programmable logic array means connected to an output of said shifting means, said programmable logic array means storing a predetermined codeword;

third mapping means for outputting information corresponding to the predetermined codeword in said programmable logic array means;

control means for determining, in response to the output signal from said deformatting means, whether to use one of the new codeword and an existing codeword and outputting a select control signal in accordance with a discriminated result;

fourth mapping means for outputting information corresponding to the new codeword from said programmable logic array means; and second multiplexing means for selectively outputting the output information from one of said third and fourth mapping means in response to the select control signal from said control means.

4. An apparatus for compressing and expanding a video signal according to claim 1, wherein said quantization means includes:

a frame delay for delaying input image data in a unit frame;

a subtracter for subtracting an output signal of said frame delay from the input image data to generate a difference signal;

a scene change detector for comparing the difference signal from said subtracter with a scene change threshold value to detect a scene change in the input image data;

a motion detector for comparing the difference signal from said subtracter with a motion estimation threshold value to detect a motion in the input image data;

a main codebook for forming variable sub-codebooks for a still picture in response to output signals from said scene change detector and motion detector;

a codebook controller for performing a control operation to select a specified portion of said main codebook and variable sub-codebooks in response to the output signals from said scene change detector and motion detector;

a vector formation unit for converting the input image data to a vector;

a distortion measurement unit, responsive to the output signals from said scene change detector and motion detector and an output signal from said vector formation unit, for obtaining a codeword with a minimum distortion using said variable sub-codebooks when the input image data is the still picture and using said main codebook when the input image data is a motion picture; and a code assignment unit for assigning a proper code to an output signal from said distortion measurement unit.

5. An apparatus for compressing and expanding a video signal according to claim 4, wherein said variable sub-codebooks have a size smaller than that of said main codebook.

6. An apparatus for variable length coding of a video signal depending on image characteristics using image compression coding means which are comprised of well-known devices and operating functions including discrete cosine transform, quantization, motion compensation, motion estimator, inverse discrete cosine transform, and inverse quantization, the apparatus comprising scene change detection means for detecting a scene change in the video signal inputted through an input terminal;

variable length coder control means for stopping a learning occurring after the scene change and performing a new learning for a predetermined time period and allowing an optimum symbol to correspond to a given codebook, the variable length coder control means comparing a bit amount generated using the optimum symbol with a bit amount generated using an existing symbol in response to a scene change detect signal from said scene change detection means and a statistical characteristic of said changed scene, the variable length coder control means outputting a new symbol when a gain is present in accordance with a result of comparison of the bit amounts;

first mapping means for outputting information corresponding to an output signal from image compression coding means;

second mapping means for outputting information corresponding to said new symbol from said variable length control means;

multiplexing means for selectively outputting the output information from one of said first and second mapping means; and variable length coder means for reducing an amount of the output information from said multiplexing means without losing a characteristic of the output information from said multiplexing means.

7. An apparatus for expanding a video signal in response to a received video compression signal, the apparatus comprising:

deformatting means for deformatting an output signal from said received video compression signal to a suitable reception format;

buffering means for adjusting a number of bits of an output signal from said deformatting means at a desired rate;

shifting means for shifting an output signal from said buffering means;

programmable logic array means connected to an output: of said shifting means, said programmable logic array means storing a predetermined codeword;

first mapping means for outputting information corresponding to the predetermined codeword in said programmable logic array means;

control means, responding to the output signal from said deformatting means for determining, whether to use one of a new codeword or the predetermined codeword, the control means outputting a select control signal in accordance with a determination result;

second mapping means for outputting information corresponding to the new codeword; and multiplexing means for selectively outputting the output information from one of said first and second mapping means in response to the select control signal from said control means.

8. An apparatus for compressing and expanding a video signal, comprising:

motion estimation means having an input terminal for estimating a motion in the video signal inputted through the input terminal and generating a motion vector signal;

motion compensation means for compensating for the motion in the video signal in response to the motion vector signal;

subtraction means for subtracting an output signal of said motion compensation means from the video signal to output a difference signal;

discrete cosine transform means for performing a discrete cosine transform with respect to the difference signal from said subtraction means to remove spatial redundancy;

vector quantization means for compressing output information from said discrete cosine transform means, the output information from said discrete cosine transform means being approximated to a finite number of values to reduce an amount of the output information from said discrete cosine transform means;

inverse vector quantization means for restoring an output signal from said quantization means to an original state;

inverse discrete cosine transform means for transforming an output signal from said inverse vector quantization means to a spatial signal;

adding means for adding an output signal from said inverse discrete cosine transform means to the output signal from said motion compensation means and feeding back a resultant signal to said motion compensation means;

first mapping means for outputting information corresponding to the output signal from said quantization means;

scene change detection means for detecting a scene change in the video signal inputted through the input terminal;

variable length coder control means for comparing a bit amount generated using the optimum symbol with a bit amount using an existing symbol in response to a scene change detect signal from said scene change detection means, the variable length coder control means outputting a new symbol when a gain is present in accordance with a result of comparison of the bit amounts;

second mapping means for outputting information corresponding to a new codeword from said variable length control means;

first multiplexing means for selectively outputting the output information from one of said first and second mapping means;

variable length coder means for reducing an amount of the output information from said first multiplexing means without losing a characteristic of the output information from said first multiplexing means;

first buffering means for preventing one of an underflow and an overflow of an output signal from said variable length coder means resulting from transmission at a fixed bit rate; and formatting means for formatting an output signal from said first buffering means to a suitable transmission format.

9. The apparatus of claim 8 wherein the variable length coder control means stops a learning occurring after the scene change and performs a learning for a predetermined time period and allows an optimum symbol to correspond to a given codebook, the variable length coder control means comparing a bit amount generated using the optimum symbol with a bit amount, generated using an existing symbol in response to a scene change detect signal from said scene change detection means and a statistical characteristic of said changed scene, the variable length coder control means outputting a new symbol when a gain is present in accordance with a result of comparison of the bit amounts.

* * * * *

UNITED STATES PATENT AND TRADEMARK OFFICE
CERTIFICATE OF CORRECTION

PATENT NO.: 6,046,774

DATED: April 4, 2000

INVENTORS: Seo Weon HEO et al.

It is certified that an error appears in the above-identified patent and that said Letters Patent is hereby corrected as shown below:

Claim 1, Column 10, line 6, "notion" should read --motion--.

Claim 7, Column 13, line 16, after "output", delete ":".

Claim 7, Column 13, line 24, after "determining", delete ",".

Claim 9, Column 14, line 46, after "performs a", insert --new--.

Claim 9, column 14, line 50, after "amount", delete ",".

Signed and Sealed this

Twenty-fourth Day of April, 2001

NICHOLAS P. GODICI

Attest:

Attesting Officer

Acting Director of the United States Patent and Trademark Office